US007907750B2

(12) United States Patent
Ariyur et al.

(10) Patent No.: US 7,907,750 B2
(45) Date of Patent: Mar. 15, 2011

(54) SYSTEM AND METHOD FOR AUTONOMOUS OBJECT TRACKING

(75) Inventors: Kartik B. Ariyur, Minnetonka, MN (US); Saad J. Bedros, West St. Paul, MN (US); Dennis W. Strelow, Sunnyvale, CA (US); Vassilios Morellas, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1311 days.

(21) Appl. No.: 11/423,659

(22) Filed: Jun. 12, 2006

(65) Prior Publication Data
US 2007/0286456 A1 Dec. 13, 2007

(51) Int. Cl.
*G06K 9/00* (2006.01)
*H04N 5/225* (2006.01)

(52) U.S. Cl. .......................................... 382/103; 348/169
(58) Field of Classification Search .................... 382/103
See application file for complete search history.

(56) References Cited

U.S. PATENT DOCUMENTS

| 5,164,827 | A | * | 11/1992 | Paff ................................ 348/143 |
| 5,644,386 | A | * | 7/1997 | Jenkins et al. ................. 356/4.01 |
| 5,850,352 | A | * | 12/1998 | Moezzi et al. .................. 345/419 |
| 5,862,517 | A | * | 1/1999 | Honey et al. .................... 702/85 |
| 5,912,700 | A | * | 6/1999 | Honey et al. ................... 348/157 |
| 6,042,050 | A | * | 3/2000 | Sims et al. ..................... 244/3.17 |
| 6,151,424 | A | * | 11/2000 | Hsu ................................ 382/294 |
| 6,195,122 | B1 | * | 2/2001 | Vincent .......................... 348/169 |
| 6,522,396 | B1 | * | 2/2003 | Halmos .......................... 356/5.01 |
| 6,707,487 | B1 | * | 3/2004 | Aman et al. .................... 348/169 |
| 6,867,799 | B2 | * | 3/2005 | Broemmelsiek ............... 348/169 |
| 2003/0095186 | A1 | * | 5/2003 | Aman et al. .................... 348/162 |
| 2003/0210329 | A1 | * | 11/2003 | Aagaard et al. ................ 348/159 |
| 2003/0219146 | A1 | * | 11/2003 | Jepson et al. .................. 382/103 |
| 2004/0100563 | A1 | * | 5/2004 | Sablak et al. ................ 348/211.4 |

OTHER PUBLICATIONS

Born et al., Principles of Optics, Cambridge University Press, New York, 2001.
http://www.vision.caltech.edu/bouguetj/calib_doc, J-Y, Bouget, "Camera Calibration Toolbox for MATLAB," 5 pages, prior to filing date of current application, printed Jan. 15, 2007.
Doucet et al., "Sequential Monte Carlo Methods," Springer-Verlag, New York, NY, 2001. Entire Book to Be Provided by Mail.
Heikkila, Geometric Camera Calibration Using Circular Control Points,: IEEE Transactions on Pattern Analysis and Machine Intelligence, vol. 22, No. 10., pp. 1066-1077, Oct. 2000.

(Continued)

*Primary Examiner* — David P Rashid
(74) *Attorney, Agent, or Firm* — Seager Tuft & Wickhem LLC

(57) ABSTRACT

A system for autonomous object tracking with static camera arrangements. Each camera arrangement may minimally have a pan-tilt-zoom camera and a range or depth sensor. Imaging may provide coordinates and depth information of a tracked object. Measurements of an image centroid position and width may be obtained with processing. Maintaining an image at the center of a camera screen may be attained at a pixel width of the image. Estimation and prediction of object size and position may be processed for providing pan, tilt and zoom rates for the camera. Pan, tilt and zoom latency may be accounted for in the system. There may be a number of camera arrangements where tracking of the object may be handed off by one camera arrangement to another.

15 Claims, 18 Drawing Sheets

OTHER PUBLICATIONS

Landau et al., "The Theory of Classical Fields," Butterworth-Heinemann, 1996. Entire Book to Be Provided by Mail.

Vincze et al., "Robust Vision for Vision-Based Control of Motion," IEEE Press, New York, NY, 2000.

Willson, "Modeling and Calibration of Automated Zoom Lenses," Proceedings of SPIE—The International Society for Optical Engineering, pp. 170-186, vol. 2350, 1994.

\* cited by examiner

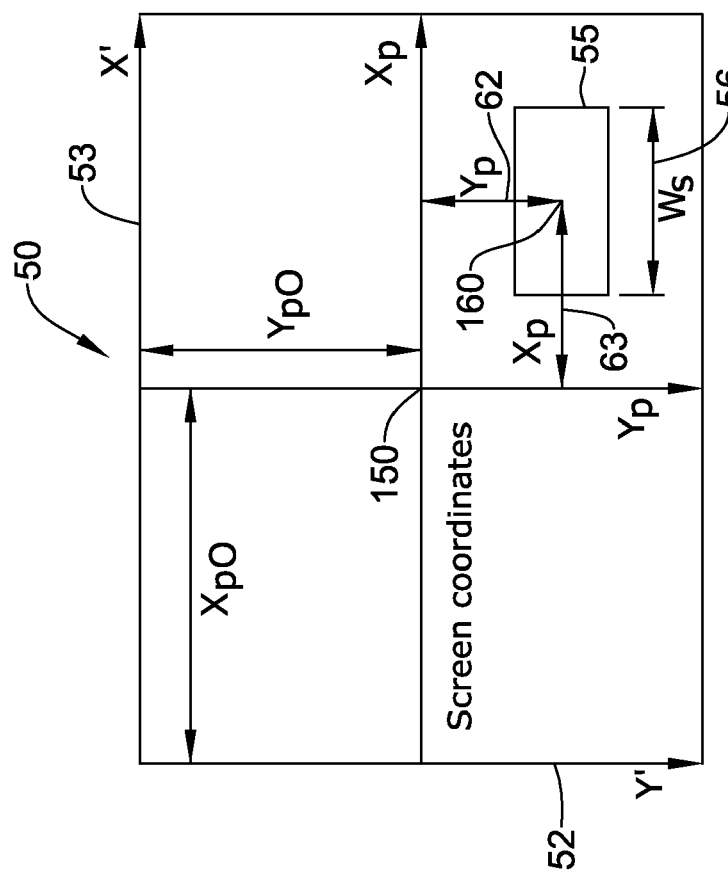
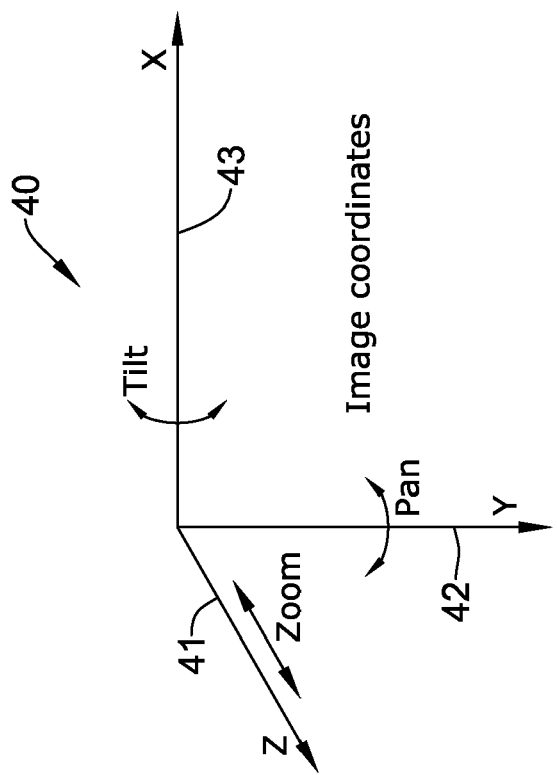
Figure 3B
Figure 3A

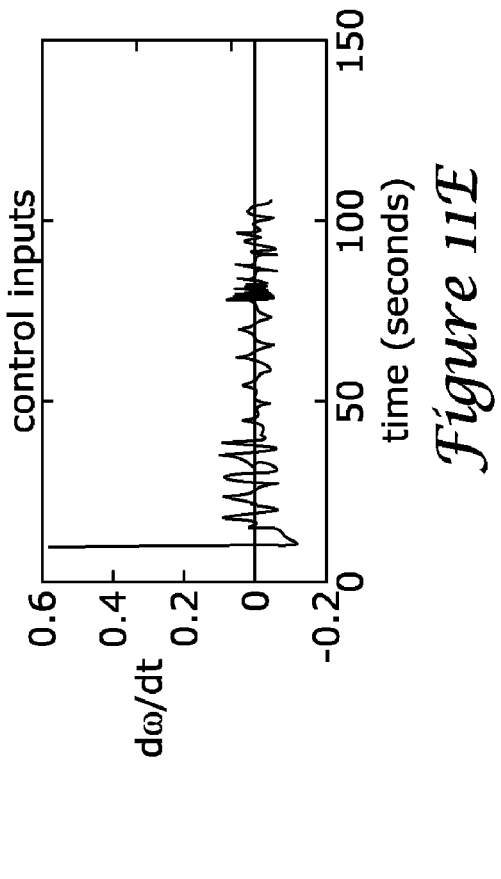
Figure 11E
Figure 11D
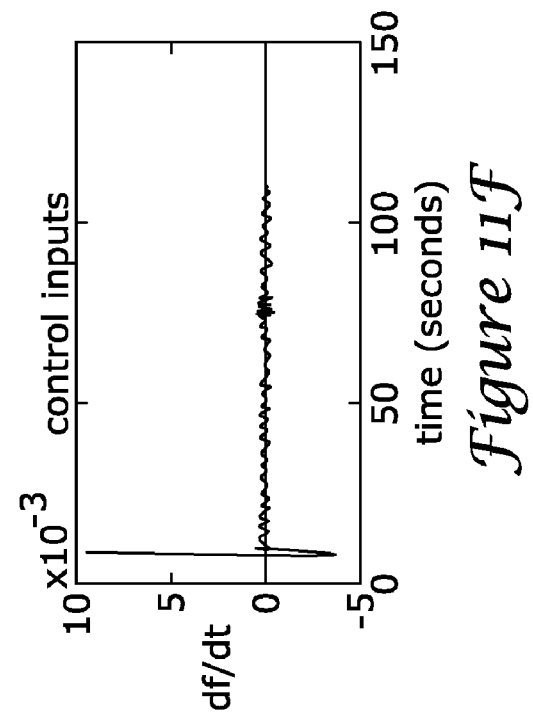
Figure 11F

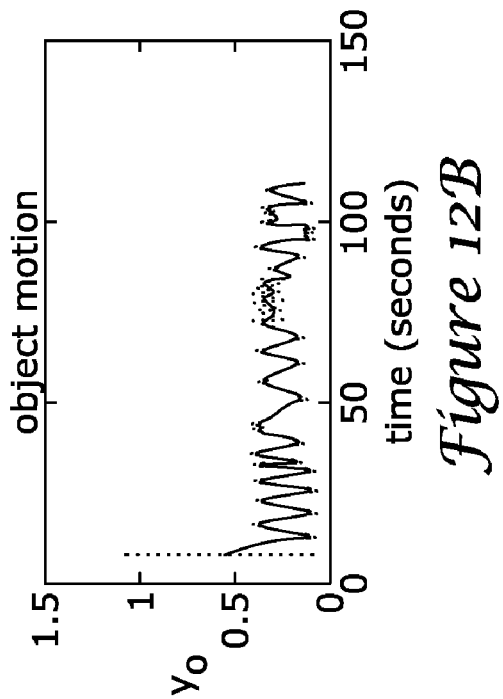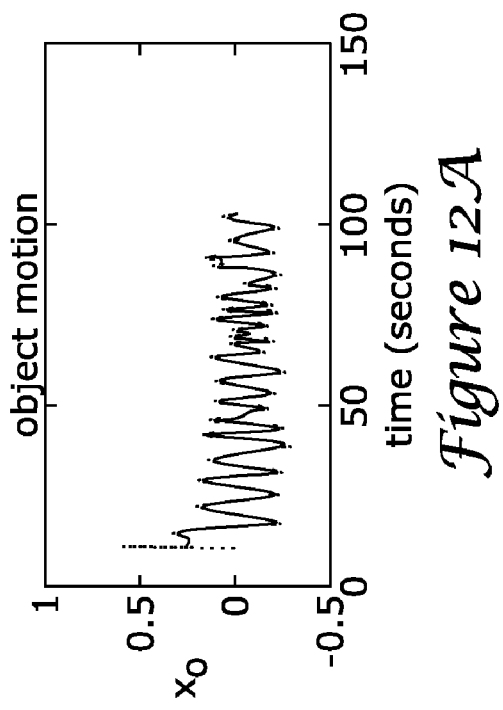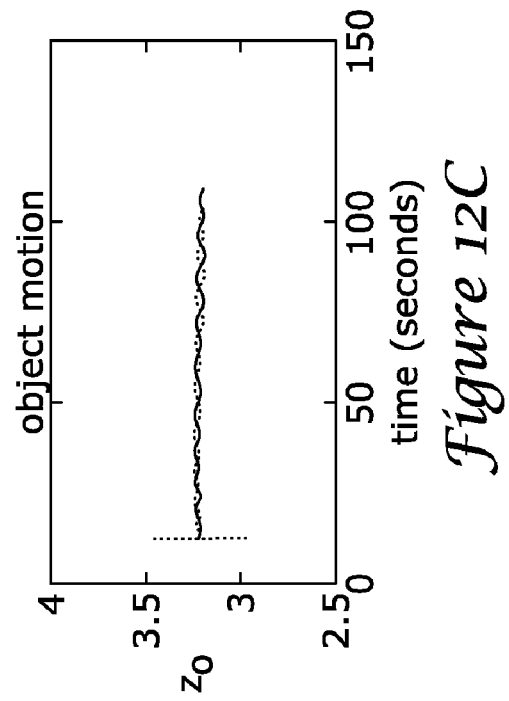

SYSTEM AND METHOD FOR AUTONOMOUS OBJECT TRACKING

BACKGROUND

The present invention pertains to tracking and particularly tracking with cameras. More particularly, the invention pertains to tracking with static cameras.

SUMMARY

The invention is a system for object tracking with a pan-tilt-zoom camera in conjunction with an object range sensor.

BRIEF DESCRIPTION OF THE DRAWING

FIGS. 3a and 3b show image and screen coordinates, respectively;

FIGS. 11d, 11e and 11f show plots of control inputs corresponding to the measurements of FIGS. 11a, 11b and 11c, respectively;

FIGS. 12a, 12b and 12c show object motion plots;

DESCRIPTION

Figure 1:
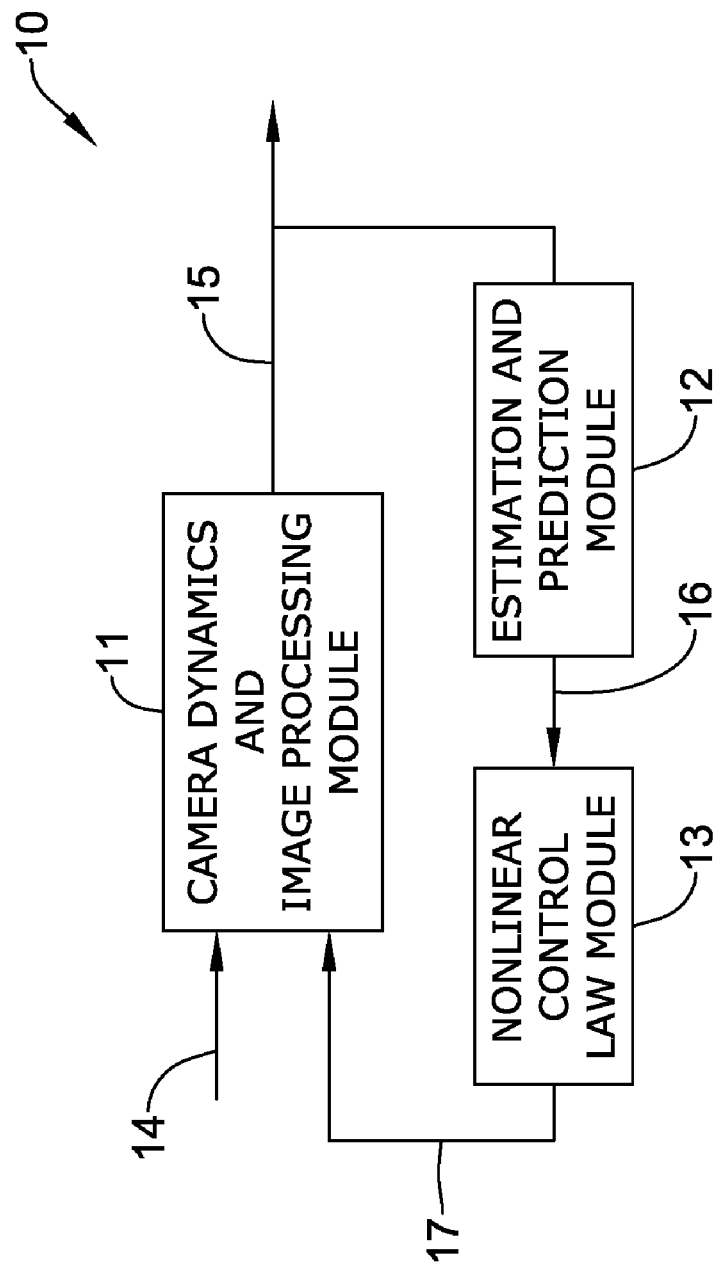
FIG. 1 is a diagram of a camera tracking system.

The present system, the invention, may involve autonomous tracking with static cameras. One of the challenges is maintaining an image at the center of a camera screen at a commanded pixel width of the image. Related art methods of tracking objects with cameras appear to need enormous tweaking or tuning by experts. The present system is a model based control approach that makes the tweaking possible by technicians as it reduces the control tuning to the tuning of three independent parameters. Thus, the present approach or system may make the installation of surveillance networks of pan-tilt-zoom (PTZ) cameras easy and economical.

The present system may provide controls for object tracking by a static PTZ camera in conjunction with an object range sensor. Measurements of the image centroid position and image width may be obtained from image processing, and object depth from the range sensor, may be used to drive the pan, tilt and zoom rates. The system may include an exponential observer for the object world coordinates based on the constant acceleration point mass model, and an exponentially stabilizing nonlinear control law for the pan, tilt and zoom rates. "Control law" may be regarded as a term of art relating to a specific algorithm or pattern of control generating commands from a controller or a control system.

The overall system may have stable performance in a wide variety of conditions of interest. The results for static cameras may be extended to those on moving platforms. With the present approach, depth may be estimated when the object is within the view of two cameras.

Much tracking of objects by cameras may use local models of image formation in conjunction with both model-based, such as a linear quadratic regulator (LQR) approach, and non-model-based control, such as a proportional-integral-derivative (PID) approach. A challenge in these approaches is that the controller for each camera should be specially tuned to the unique environmental conditions at its location. This may make the establishment of large networks of cameras rather complex and expensive. The present approach or system should not require special tuning for a change of location or place of the camera.

The present system may begin as an attempt to integrate image processing and control to create a scalable and inexpensive network of tracking cameras. It may include an additional measurement of depth in conjunction with a detailed model of the image formation process. This component may be part of the control system. The depth measurement may be regarded as an important component of the present approach or system.

The dynamics of image processing between camera control inputs and image measurements tend to be highly nonlinear. Also, image processing may result in very noisy measurements. Besides, there may be several latencies in the system, which include those of the image processing, the network, and the actuators.

The parameters to note or track may include the coordinates of the center of mass (or equivalent) of the pixel pattern and a relevant measure of the pattern size such as image width, or the number of pixels in the pattern, or the distance between specific pixels inside the pattern, or any related measure whose variance is small. However, the present control laws may regulate the image coordinates rather than pixel coordinates. This approach may permit a decoupling of the pan and tilt controls from the zoom control. The model object motion may be modeled with point mass constant acceleration models for each of its three-dimensional (3D) coordinates for the purpose of tracking (i.e., an application of an internal model principle in control theory).

The present control system may overcome the challenges associated with nonlinear dynamics, noise and multiple latencies and provides exponential tracking. Moreover, this control design may involve only the selection of three independent parameters, implementable even by a technician, or, better still, the selection may be automated.

FIG. 1 shows a system with processing steps involved. The present approaches of estimation and prediction may naturally extend to control of coordination and handoff between different cameras, since object depth and size information are estimated for use in the present control design.

Several steps of the processing of system 10 shown in FIG. 1 (clockwise from top left) may be indicated herein. The system may include camera and motion models, the estimation and prediction performed with those models, and the tracking control laws for the camera. An illustrative example of tracking results on an experimentally collected data sequence may be noted herein. An application of the present system to cameras on moving platforms is mentioned. Also, an illustrative example of depth calculation from measurements from two PTZ cameras with the present system 10 is revealed.

FIG. 1 is a block diagram of an illustrative example of system 10 for tracking. System 10 may include a camera dynamics and image processing module 11. A "module" may include hardware and/or software portions of a system. An output 15 of module 11 may go to an input of an estimation and prediction module 12. An output 16 from the module 12 may go to a nonlinear control law module 13 which in turn has an output that may go to an input 17 of module 11. An input 14 to the system may be another input to module 11. The input 14 includes position and size, and object motion. The output 15 of module 11 may be regarded as the output of system 10. This output 15 includes position and size in the image plane, and image motion and object depth. This information may go to module 12. The output 16 of module 12 may include object size and position estimate information going to module 13. The output of module 13 may include control inputs and pan, tilt and zoom rates to the input 17 of module 11.

Figure 2:
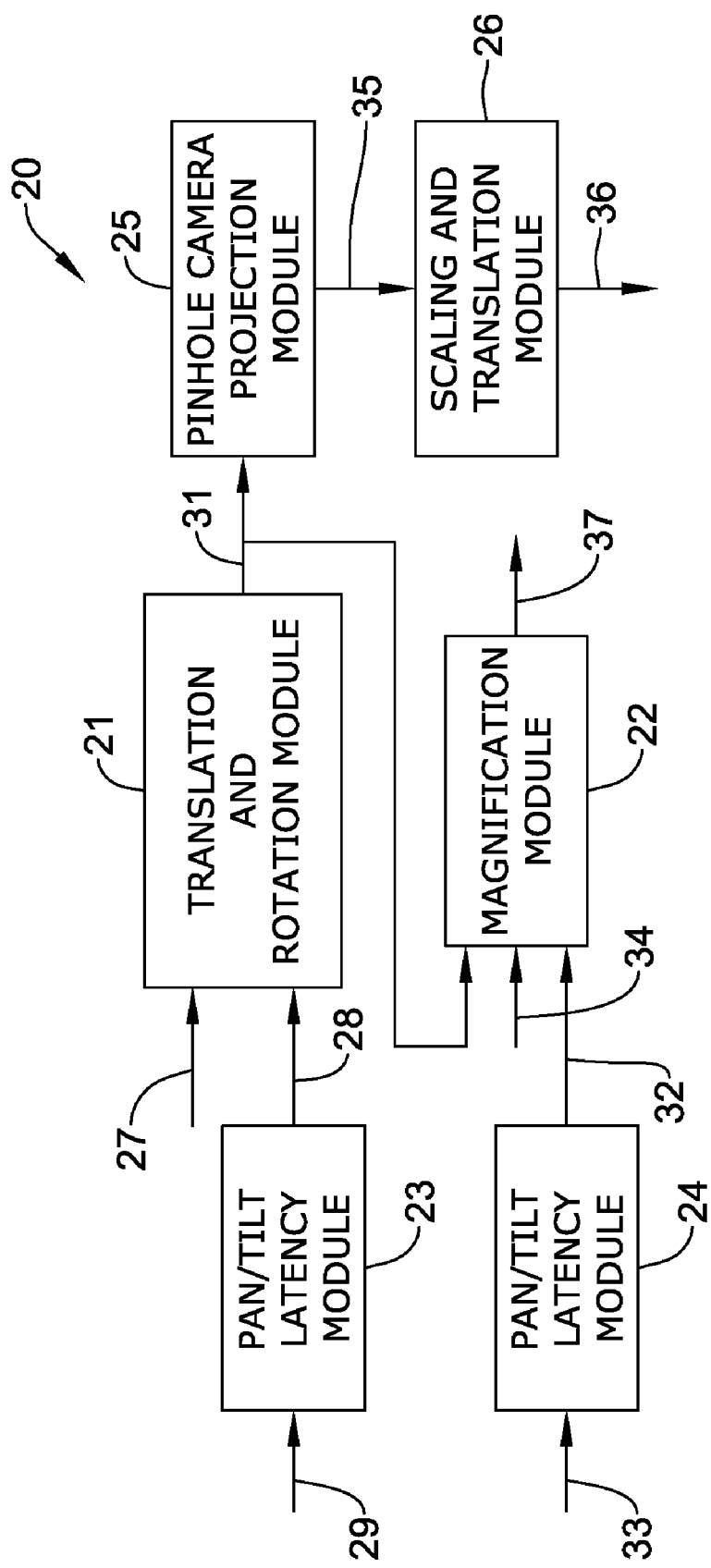
FIG. 2 is a diagram of camera system dynamics.

Motion and camera models may be significant in the present system 10. Two different models may be dealt with—a motion model of the object and a processing model of the camera adequate for the purpose of tracking control. FIG. 2 shows the various processes that may occur inside a camera—object motion being converted to image motion through rotation, translation, projection, and magnification, to motion in the image plane. In essence, FIG. 2 is a diagram of a camera system 20 with modules of its dynamics. The system 20 may include a translation and rotation module 21 and a magnification module 22. An input 27 to the module 21 may include object coordinates. An input 28 to module 21 may include pan/tilt latency information from the pan/tilt latency module 23. Pan and tilt commands may be an input 29 to module 23. An output 31 of module 21 may include camera coordinates. The output 31 may provide coordinate information to an input of the magnification module 22. A zoom latency module 24 may output zoom latency information to an input 32 of module 22. An input 33 to module 24 may include zoom command information. Another input 34 to module 22 may include depth and object size parameters. An output 37 of module 22 may provide an object size in pixel coordinates. The output 31 of module 21 may go to an input of a pinhole camera projection module 25. An output 35 of module 25 may go to a scaling and translation module 26. An output 36 from module 26 may provide pixel coordinates.

The camera model may be described. Both for the purpose of control design and building a simulation test bed for the control system, one may model all of the necessary steps of the image formation process, and the processing of the image. Since one may control pan, tilt and zoom (focal length), and measure camera outputs of image center position and image width (or an equivalent size parameter with minimum variance), one needs the mapping between the position and size of the object to its position and size in the camera image plane.

One may treat the camera as mounted on a ceiling and with an inertial coordinate system fixed to it. An image coordinate system 40 with relevant axis orientations is shown in FIG. 3a. The z-axis 41 may be parallel to the ground/ceiling and virtually identical to the camera optical axis at zero pan and tilt. The y-axis 42 may be perpendicular to the ground and parallel to the image y-axis at zero pan and tilt. The x-axis 43 may be orthogonal to the optical axis of the camera and virtually identical to image plane x-axis at zero pan and tilt. The coordinate system z-axis 41 may be regarded as identical to the camera optical axis. Tilt may be a rotation about the x-axis 43 and pan may be a rotation about the y-axis 42. Zoom may be an optical movement along the z-axis 41.

An initial step of processing may include a transformation from inertial coordinates to camera coordinates. Since the camera is capable of two rotations, pan and tilt, the coordinate transformation may be obtained by rotating the inertial coordinates through the tilt and pan angles—

$$x_i = T(\phi, \omega)x_o + O_c, \quad\quad 2.1$$

$$x_i = \begin{pmatrix} x_i \\ y_i \\ z_i \end{pmatrix}, x_o = \begin{pmatrix} x_o \\ y_o \\ z_o \end{pmatrix}, O_c = \begin{pmatrix} O_{c,x} \\ O_{c,y} \\ O_{c,z} \end{pmatrix}, \quad\quad 2.2$$

$$T(\phi, \omega) = \begin{pmatrix} \cos\phi & \sin\omega\sin\phi & \cos\omega\sin\phi \\ 0 & \cos\omega & -\sin\omega \\ -\sin\phi & \sin\omega\cos\phi & \cos\omega\cos\phi \end{pmatrix}, \quad\quad 2.3$$

where $x_i$ is the position of the object in camera coordinates, $x_o$ is the position of the object in the inertial world coordinate system, $O_c$ is the origin of the camera coordinate system in the inertial coordinate system, $\Phi$ is the pan angle, and $\omega$ is the tilt angle.

Figure 4:
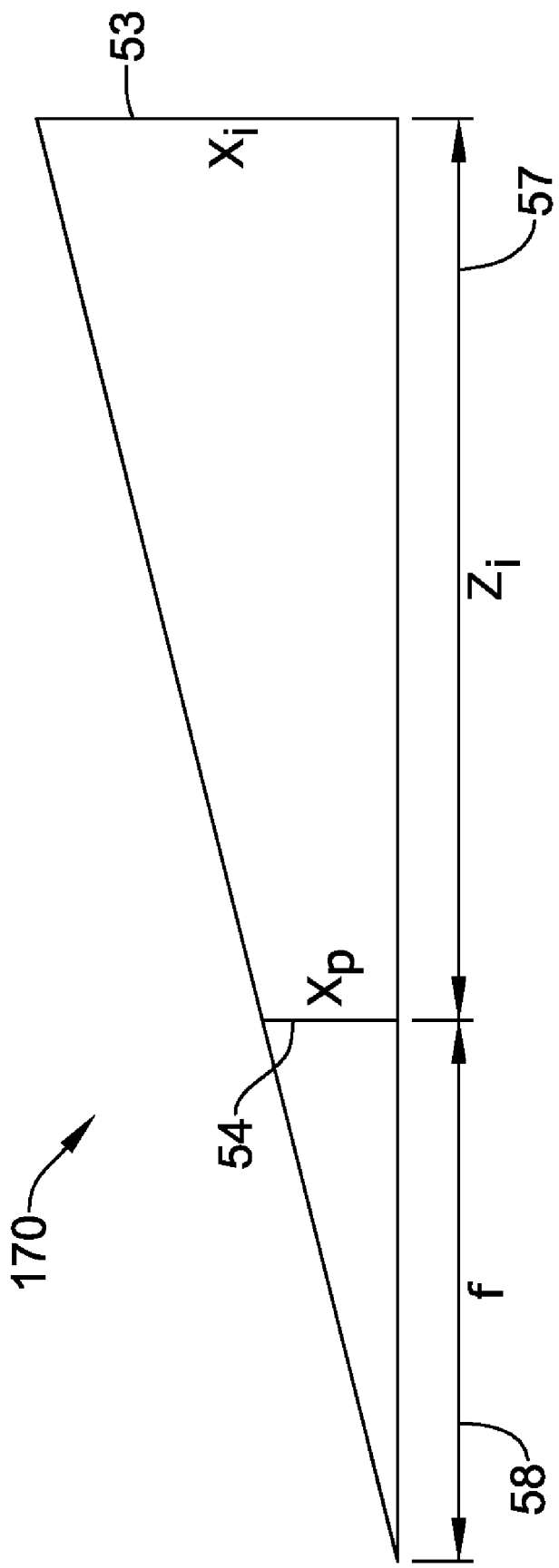
FIG. 4 shows a projection of an image relative to a pinhole model.

FIG. 3b shows a screen coordinate system 50. FIGS. 3b and 4 reveal a geometric relationship between the image coordinates $x_i$ 53 and $y_i$ 52 (viz., x' and y'), and the pixel coordinates $x_p$ 63 and $y_p$ 62 in a projection or image 55 of the object onto a screen. Coordinate $y_i$ 52 may be measured perpendicular to a planar surface of FIG. 4. The image 55 may be shifted so that its center 160 lies on the center 150 of the screen of system 50. This screen may be, for instance, about 320 by 238 pixels, or another pixel dimension.

FIG. 4 shows the projection in the context of a pinhole model 170. Line 53 in FIG. 4 may indicate an actual size of an object and line 54 may be a scaled down dimension 53 or indication of the object on a screen of a camera. For illustrative purposes, one may choose $O_c=(O_{c,x},O_{c,y},O_{c,z})=(0,0,0)$ on the camera—since one is dealing with just one camera in the present system. This choice may be arbitrary. In the case where the camera is on a moving platform, this origin may have its own motion, and can be compensated for in a controller. The projection onto the screen may be indicated by the following equation, $$\begin{pmatrix} x_p \\ y_p \end{pmatrix} = \frac{f}{z_i}\begin{pmatrix} S_x & 0 \\ 0 & S_y \end{pmatrix}\begin{pmatrix} x_i \\ y_i \end{pmatrix} + \begin{pmatrix} x_{p0} \\ y_{p0} \end{pmatrix}, \quad\quad 2.4$$

where f item 58, is the focal length, $S_x$ and $S_y$ are pixel scaling factors, $(x_p,y_p)$ are the pixel coordinates of the point, and $(x_{p0},y_{p0})$ show the origin of the pixel coordinate system (e.g., it may be at (160, 119) pixels in the present camera).

Tangential and radial distortion in the optical system may be ignored as the present camera should have little distortion. If the distortions are monotonic functions, their inverses may be used (for compensation) within the control laws derived to provide essentially the same results as a camera with no distortion.

Magnification may be noted. For an object of constant width w that is orthogonal to the optical axis of the camera, the width of the image on the screen may be obtained (i.e., this is usually an approximation, but generally a good one) from the equation for magnification by a thin lens, $$w_s/w = \frac{1}{1+\frac{z_i}{f}}, \qquad 2.5$$

where $w_s$, item 56, is the width of the object's image 55 (FIG. 3*b*), and $z_i$, item 57 (FIG. 4), the depth in the camera coordinate system, is the distance of the object from the lens plane along the optical axis of the camera. The distance between the lens and the imager may be neglected. Since that distance is small compared to the depth of the object, it should not affect the accuracy of the present calculations.

Image processing and actuation may be noted. One may model the image processing that yields the position and size of the object on the image plane as a time delay $\tau_p$ since its time of calculation is fairly predictable. Even if this latency cannot be calculated a priori for an image processing algorithm, one may simply calculate it at every measurement through use of time stamps, for use in the estimation and prediction. The control inputs may include the pan, tilt and zoom rates, $$\dot{\Phi} = u_1(t-\tau_\Phi), \qquad 2.6$$

$$\dot{\omega} = u_2(t-\tau_\omega), \text{ and} \qquad 2.7$$

$$\dot{f} = u_3(t-\tau_f), \qquad 2.8$$

where $\tau_\Phi$, $\tau_\omega$, and $\tau_f$ are the latencies of the motors controlling pan, tilt and zoom rates. In the case where the camera platform is rotating, its yaw $\delta_1(t)$ and pitch rates $\delta_2(t)$ enter as disturbances into equations 2.6 and 2.7, $$\dot{\Phi} = u_1(t-\tau_\Phi) + \delta_1(t) \text{ and} \qquad 2.9$$

$$\dot{\omega} = u_2(t-\tau_\omega) + \delta_2(t). \qquad 2.10$$

Motion modeling may be done in world coordinates. Object motion may be modeled with constant acceleration models for each of its 3D coordinates. Denoting the state of each of the coordinates by $s_j = (p_j, v_j, a_j)$, where $p_j = x_o$, or $y_o$, or $z_o$, each of the motion models may then be of the following form, $$\dot{s}_j = A_j s_j, \qquad 2.11$$

$$p_j = C_j s_j, \text{ and} \qquad 2.12$$

$$A_j = \begin{pmatrix} 0 & 1 & 0 \\ 0 & 0 & 1 \\ 0 & 0 & 0 \end{pmatrix}, C_j = (1\ 0\ 0). \qquad 2.13$$

Using the measurements of pixel coordinates and depth, observers and predictors may be designed for object motion using the model herein.

Estimation and prediction is a significant aspect. The world coordinates of the object may be calculated from pixel coordinates and depth by inverting the operations of projection and coordinate transformation at time $(t-\tau_p)$, where $\tau_p$ is the image processing delay, $$\begin{pmatrix} x_i \\ y_i \end{pmatrix}(t-\tau_p) = \frac{z_i}{f}\begin{pmatrix} \frac{1}{S_x} & 0 \\ 0 & \frac{1}{S_y} \end{pmatrix}\left(\begin{pmatrix} x_p \\ y_p \end{pmatrix} - \begin{pmatrix} x_{p0} \\ y_{p0} \end{pmatrix}\right), \qquad 3.1$$

$$x_o(t-\tau_p) = T^{-1}(\phi,\omega)(x_i - O_c), \text{ and} \qquad 3.2$$

$$T^{-1}(\phi,\omega) = T^T(\phi,\omega). \qquad 3.3$$

$T^{-1}(\Phi,\omega) = T^T(\Phi,\omega)$ because T is an orthogonal rotation matrix.

Some filtering of measurements may be necessary before the algebraic operations mentioned herein. Where needed, this filtering may be tailored to the specific noise characteristics of the measurements. For the most part, the filtering may be done by the observers for the world coordinates. One purpose may be to maintain consistency in the system modeling assumptions. Observers for the motion models of indicated herein may be of the standard Luenberger form, $$\dot{\hat{s}}_j(t-\tau_p) = (A_j - L_j C_j)\hat{s}_j(t-\tau_p) + L_j C_j s_j(t-\tau_p), \text{ and} \qquad 3.4$$

$$\hat{s}_j(t+\tau_k) = \exp(A_j(\tau_p+\tau_k))\hat{s}_j(t-\tau_p), \qquad 3.5$$

where $L_j$ is the observer gain that can be set using a variety of design procedures (such as from a Ricatti equation in a Kalman filter) $\tau_k = \tau_\Phi, \tau_\omega, \tau_f$ depending upon the control law which uses the prediction. The reason for using predictions at different points in the future may be that each of the actuators has a different latency. This way, one may be able to accurately the handle the multiple latencies in the system to produce an exponential observer. The current framework may also permit adding the latencies of the observer and control law calculations. Finally, the approach herein may permit more complicated linear-time-invariant dynamic models for the object world coordinates. For example, one may be able to use models of gait, and typical time constants of human walking or running. Predictions of image coordinates and their derivatives may be obtained with equation 3.5 to attain state predictions, at the appropriate time, of the world coordinates. Equation 2.1 may yield the image coordinates, and differentiating may yield a equation for higher derivatives of image coordinates. For example, image coordinate velocities are given by $$\dot{x}_i = \dot{T}(\Phi,\omega)x_0 + T(\Phi,\omega)\dot{x}_0 + \dot{O}_c, \qquad 3.6$$

where $\dot{T}(\Phi,\omega)$ refers to an element by element differentiation of the matrix $T(\Phi,\omega)$, and $\dot{O}_c$ is the translational velocity of the camera.

The control system may include two parts. The first part is the tracking of the image of the object on the screen through pan and tilt inputs, and the second is the regulation of image size on the screen by control of focal length (zoom control). In developing the equations for tracking on the screen, one may assume that the image of the object being tracked remains within the screen. The zoom control may ensure this over most of the camera's field of view (FOV). However, this control may naturally degrade when the tracked object is very far from the camera or very close, and the zoom limits are reached. This situation may be ameliorated in the following ways. For instance, when the object is closer to the camera, the detector may focus on a smaller portion of the pattern, and when the object is far away, the detector may focus on a larger portion of the pattern. Moreover, for the near field problem—where the object approaches the camera—one may increase the time of prediction and move the camera into position to view the object once it is sufficiently far away. In addition, one may note that the control inputs are computed for a future time, $t+\tau_k$, taking into account the actuator latencies.

One may do position tracking of an object on a screen. The controller may implement detection in conjunction with a particle filter, and with predictions from delayed measurements to regulate a pattern position of the tracked object at the center of the screen.

Screen position tracking may be done. An objective of the tracking is to maintain the center of the image at the center of the image plane. One may use the measurements of the image center from the particle filter and control the pan and tilt rates to control the center point (or any other reference point) of the image plane. Since the actuation may control the pan and tilt angular rates, i.e., velocities, one can use an integrator backstepping type control approach. In the control with the present system, one may ignore actuator dynamics because they appear insignificant (less than 30 ms) compared to the latencies of the actuators themselves (100 ms), the latency of image processing (200 ms), the network (100 ms), and the implementation of the control law (50-100 ms). Because of the speed of the responses of the camera actuators, one may also ignore the rigid body dynamics of the camera itself. Note however, that first order actuator lags may be accommodated within the current estimation plus control framework—although the resulting control laws may be more complex and use acceleration estimates.

A key aspect of the control approach is that regulation of the image coordinates $x_i$ and $y_i$ to zero may automatically result in the image being centered at $(x_{p0},y_{p0})$ in the pixel coordinates and permit decoupling of the pan and tilt controls from the zoom control. The pan and tilt control laws, respectively, may be as in the following, $$u_1(t-\tau_\phi) = -\frac{\begin{pmatrix} \cos(\phi)\dot{x}_o + \sin(\omega)\sin(\phi)\dot{y}_o + \cos(\omega)\sin(\phi)\dot{z}_o + \\ \cos(\omega)\sin(\phi)y_o - \sin(\omega)\sin(\phi)z_o + \\ \frac{\cos(\omega)\dot{y}_o - \sin(\omega)\dot{z}_0}{\sin(\omega)y_o + \cos(\omega)z_o} - \alpha_\omega y_i \end{pmatrix}}{-\sin(\phi)x_o + \sin(\omega)\cos(\phi)y_o + \cos(\omega)\cos(\phi)z_o} - \alpha_\phi x_i, \quad 4.1$$

and $$u_2(t-\tau_\omega) = \frac{\cos(\omega)\dot{y}_o - \sin(\omega)\dot{z}_o}{\sin(\omega)y_o + \cos(\omega)z_o} - \alpha_\omega v_i, \quad 4.2$$

where $\alpha_\Phi>0$ and $\alpha_\omega>0$ set the convergence rates of $x_i$ and $y_i$. The control patterns may be based on feedback linearization, and are exponentially stable in conditions where, $$z_i = -\sin(\phi)x_o + \sin(\omega)\cos(\phi)y_o + \cos(\omega)\cos(\phi)z_o \neq 0 \text{ and}$$

$$\sin(\omega)y_o + \cos(\omega)z_o = \frac{z_i + \sin(\phi)x_o}{\cos\phi} \neq 0,$$

under a full state feedback. The result may be immediate when the expressions for $\dot{x}_i$ and $\dot{y}_i$ are derived from expansion of equation 3.6, and the control inputs are substituted for the pan and tilt rates.

Singularity in the control law may be reviewed. The pan control law generally never goes singular in practice because the object is well out of view of the camera before $z_i=0$—the object passing through the image plane of the camera. Thus, for cases where tracking is possible, $z_i>0$, i.e., the object may be imaged by the camera. Secondly, $z_i+\sin(\Phi)x_o=0$ needs the pan angle and the $x_o$ to have opposite signs for $z_i\neq 0$, and this may mean that the object is on one side and the camera axis is looking the other way. This may also mean that the object is not within the field of view, unless it is very close to a camera with a wide view (e.g., a few centimeters), a situation which surveillance cameras may be positioned to avoid. For a camera that is used in the present system, the maximum lateral distance at which an object may be picked up by the imager is $$\frac{\max\{x_p\}}{S_x \min\{f\}} z_i = 0.5314 z_i,$$

and thus the singularity will not occur since $$\sin\Phi = -z_i/x_o$$

will not be satisfied.

Although the control law is exponentially stable under full state feedback, output feedback using the observers and predictors as noted herein may blow up under specific conditions, such as high speed motion of the object (this means angular motion with respect to the camera—no human being can move fast enough to evade the camera), and large initial estimation errors of object velocity and acceleration. This appears inescapable due to the latencies in the system. Besides, there is the possibility of the object escaping the finite screen of the camera before tracking is achieved.

There may be image width regulation through zoom control. To derive this control law, one may assume that the width of the object $w$ is a constant. This may be equivalent to assuming that either the object does not rotate and change its width fast, or that the detector keeps track of some measure of an object dimension that does not change very fast. Using the formula for magnification in equation 2.5, and approximating it as $w_s=f/z_i w$ and rearranging, one may have $$w = \frac{z_i}{f} w_s, \quad 4.3$$

and differentiating it yields $$\dot{w}_s = w_s\left(\frac{\dot{f}}{f} - \frac{\dot{z}_i}{z_i}\right), \quad 4.4$$

which may permit a control approach for $\dot{f}=n_3(t-\tau_f)$ to exponentially stabilize the screen image width $w_s$ relative to a reference width $w_{ref}$, $$u_3(t-\tau_f) = f\left(\frac{\dot{z}_i}{z_i} - \alpha_f \frac{w_s - w_{ref}}{w_s}\right), \text{ where } \alpha_f > 0. \quad 4.5$$

The present approach may record the 3D trajectory of an object moved in front of the PTZ camera along with the trajectory of its image centroid and a time history of its image width, and then test the performance of the control laws in a high fidelity simulation.

The present system may use PTZ devices for surveillance. Measurements may be taken and the resultant signals can be converted to drive or control actuators. There may be control inputs with pan, tilt and zoom rates to the respective actuating device or motor.

There may be several cameras, or there may be minimally one camera and a range or depth finder, e.g., ladar. Depth may be along the camera's axis. The depth is one significant characteristic of the present system. The controller 70 may provide an implementation of the control laws which can be incorporated by equations 4.1, 4.2 and 4.5 herein. Equation 4.1 may exploit the camera operation. There may be a state estimator or predictor 60 for solving a non-linear state estimation law.

There may be object tracking with static cameras for surveillance. There may be a large or small network of cameras. There may be at least two sensing-like devices or cameras at various surveillance posts or stations. One device may be used to track an object (e.g., a person) and another device to track the object's three-dimensional (3-D) coordinate location. At another surveillance post or station there may be another set of devices that can handle a field of view, though not necessarily, overlapping the field of view of the previous devices or cameras which may hand off the tracking of the object to the next set of devices (or cameras). The object, such as a person, being tracked may be marked. If the person is standing still, e.g., in a queue, then the present tracking system may obtain some data of the person for facial recognition, or for a close match, to reduce the number of searches needed for identification of the tracked object. There may be several identifying markers on the object or person.

The present system 10 may eliminate some guards in secure areas with its tracking capabilities. The cameras may be placed in strategic places or where the needs are critical. It is difficult for guards to track numerous objects or persons simultaneously. The present system may be very helpful under such situations. With related art surveillance camera systems, e.g., having PID control, the latter need to be tuned or replaced with different control schemes adjusted for particular places. The present system may have a global law that is applicable at various places of camera placement. Control tweaking may also be diminished or eliminated with the present control law (i.e., equation 4.1).

Significant hardware components of the present system 10 may include the PTZ camera, range finder and a processor. The camera system may utilize wireless networks such as for communication among the cameras so as, for example, to provide a handoff on tracking of a particular subject of object to another set of cameras.

The processing and networking of the system 10, particularly the system for tracking objects with static cameras, may incorporate algorithms for various operations such as image processing which may be done using various techniques. The algorithms may include the control laws. There may be invariant space and detection relative to rotation of the target, multi-resolution histograms, and the significant characteristic of depth information.

Camera parameters and data generation may be considered. The actuator saturations of the camera (from its manual) may be noted as $$-\frac{5\pi}{9} \leq \phi \leq \frac{5\pi}{9} \text{rad}$$
$$-\frac{5\pi}{36} \leq \omega \leq \frac{5\pi}{36} \text{rad}$$
$$3.1 \leq f \leq 31 \text{ mm.}$$ 
(5.1)

These limits may be used in the simulation of camera control. The rate limits may be $$-2\pi \leq \dot{\phi} \leq 2\pi \text{ rad/sec}$$
$$-2\pi \leq \dot{\omega} \leq 2\pi \text{ rad/sec}$$
$$-15 \leq \dot{f} \leq 15 \text{ mm/sec.}$$ 
(5.2)

The scaling factor from physical units to pixels may be determined as $S=88300, S_x=1:1S; S_y=S$ from a calibration.

Approximate latencies of the actuation may be determined from a difference between the time of issue of a command and the time of the first sign of motion in the image. Thus, $\tau_\phi$ and $\tau_\omega$ appear to be in the range of 50 to 75 ms, while $\tau_f$ appears in the range of 125 to 150 ms. The accuracy of this measurement may be limited by the 1/60 sec (17 ms) frame acquisition time.

In an illustrative illustration, a planar black target with a width of about 0.141 m may be moved in front of the camera at an almost constant depth, and its images may be acquired at a frequency of approximately 10 Hz. The position and orientation of the coordinate system of the camera may be calculated with respect to an inertial coordinate system in a laboratory in a test. The measured positions of the black target may be transformed to a coordinate system fixed to the camera and corresponding to the camera axis at zero pan and tilt. A time history of points may be generated for about a 100 seconds with a known pan, tilt and zoom for the purpose of testing the tracking control system.

Simulated tracking of an experimental trajectory may be performed. For the simulated tracking, the observers in equation 3.5 may be designed by pole placement to yield L=(26.25 131.25 125) for all of the three observers. The poles can be placed at (−20 −5 −1.25) with the maximum speed of convergence for the position and slower convergence for velocity and acceleration. The control laws may be designed as the following, $$\alpha_\phi=0.001; \alpha_\omega=0.05; \alpha_f=0.1.$$

Figure 5:
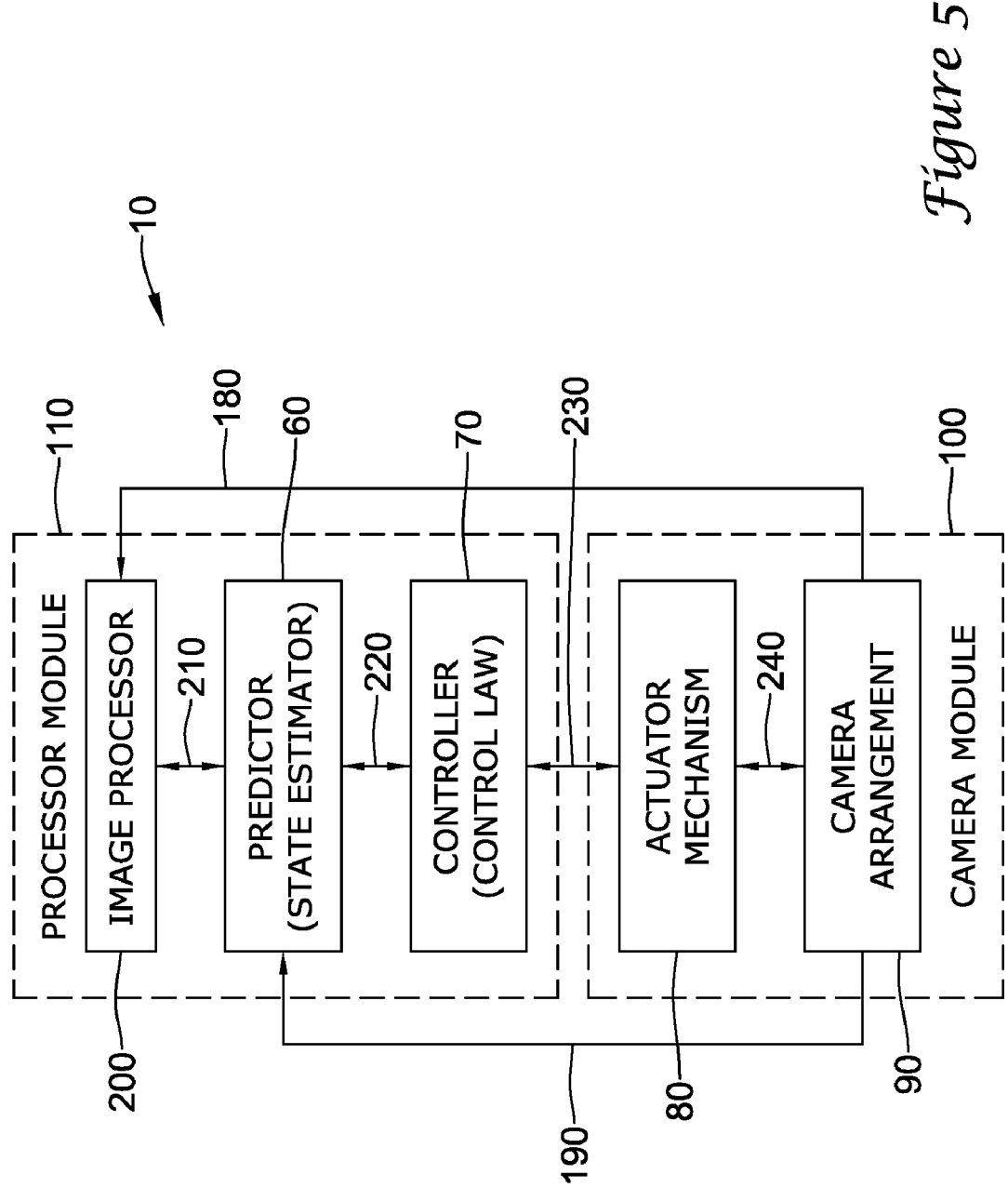
FIG. 5 is a block diagram of a basic tracking system.

FIG. 5 shows a block diagram of the tracking system 10. A camera module 100 may be connected to a processor module 110. Camera module 100 may incorporate an actuator mechanism 80 and a camera arrangement 90. Arrangement 90 may be connected to actuator 80. The processor module 110 may incorporate an image processor 200, a predictor or state estimator 60 and a controller (control law) 70. Image processor 200 may be connected to predictor 60, and predictor 60 may be connected to controller 70. Camera arrangement 90 may provide an image signal 180 to image processor 200 and a depth signal 190 to predictor 60. Image processor 200 may provide to predictor 60 a pixel position and size signal 210. 3D coordinate position, velocity and acceleration signals 220 may go from predictor 60 to controller 70. Signals 230 with pan, tilt and zoom rates may go from controller 70 to actuator mechanism 80. Pan angle, tilt angle and (zoom) focal length signals 240 may go from actuator mechanism 80 to camera arrangement 90.

Figure 6:
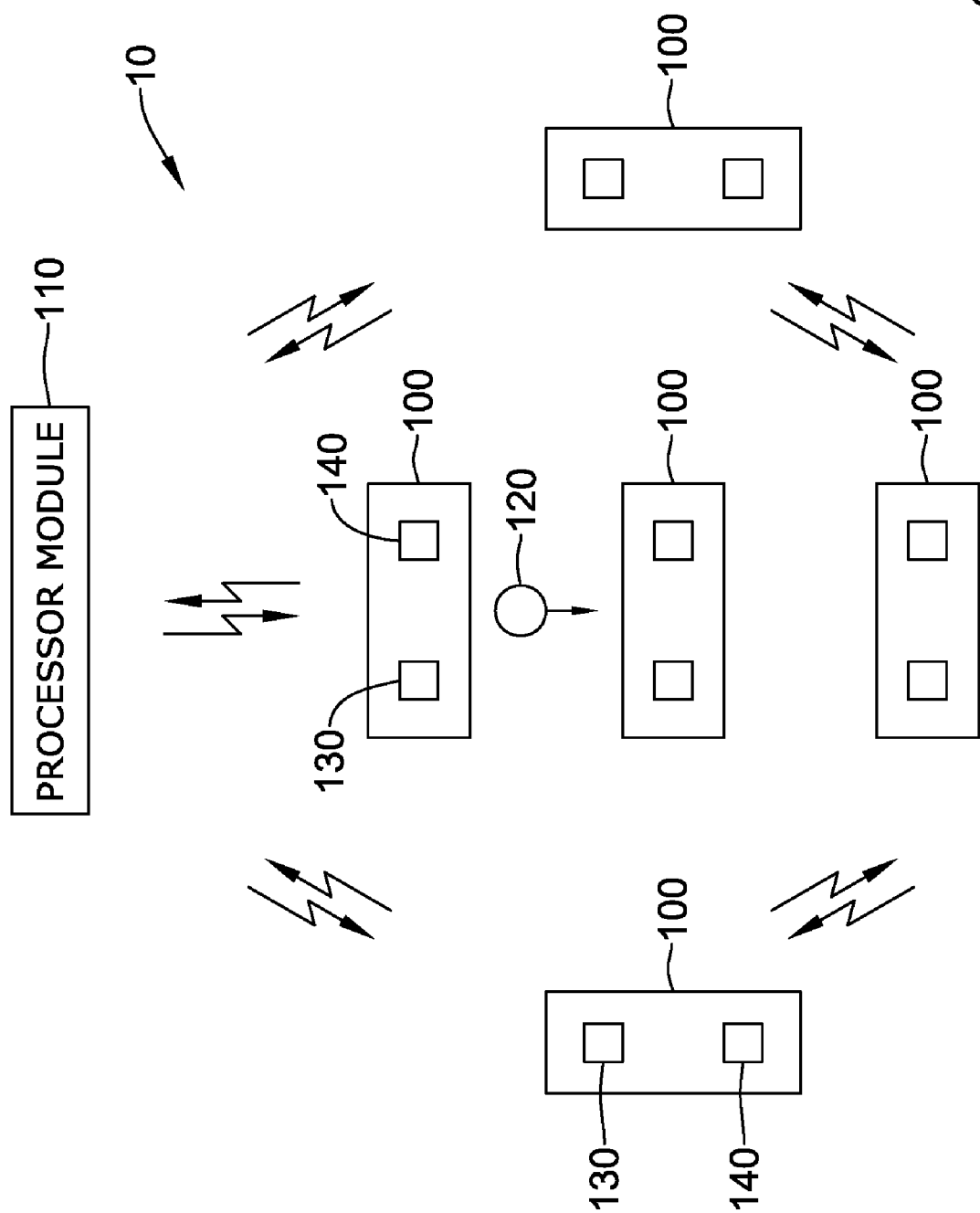
FIG. 6 is a block diagram of a network of tracking devices of the system in FIG. 5.

FIG. 6 shows a system 10 having a processor module 110 and an array of camera modules 100. Module 110 and modules 100 may be interconnected with one another by hardwire, wireless or other ways. Target 120 may be an object or person tracked by the system 10 via the modules 100 and module 110. A camera module 100 may have two cameras 130, or a camera 130 and a distance indicator or depth finder 140. A module 100 may have other combinations of just cameras, or cameras and distance indicators.

Figure 7:
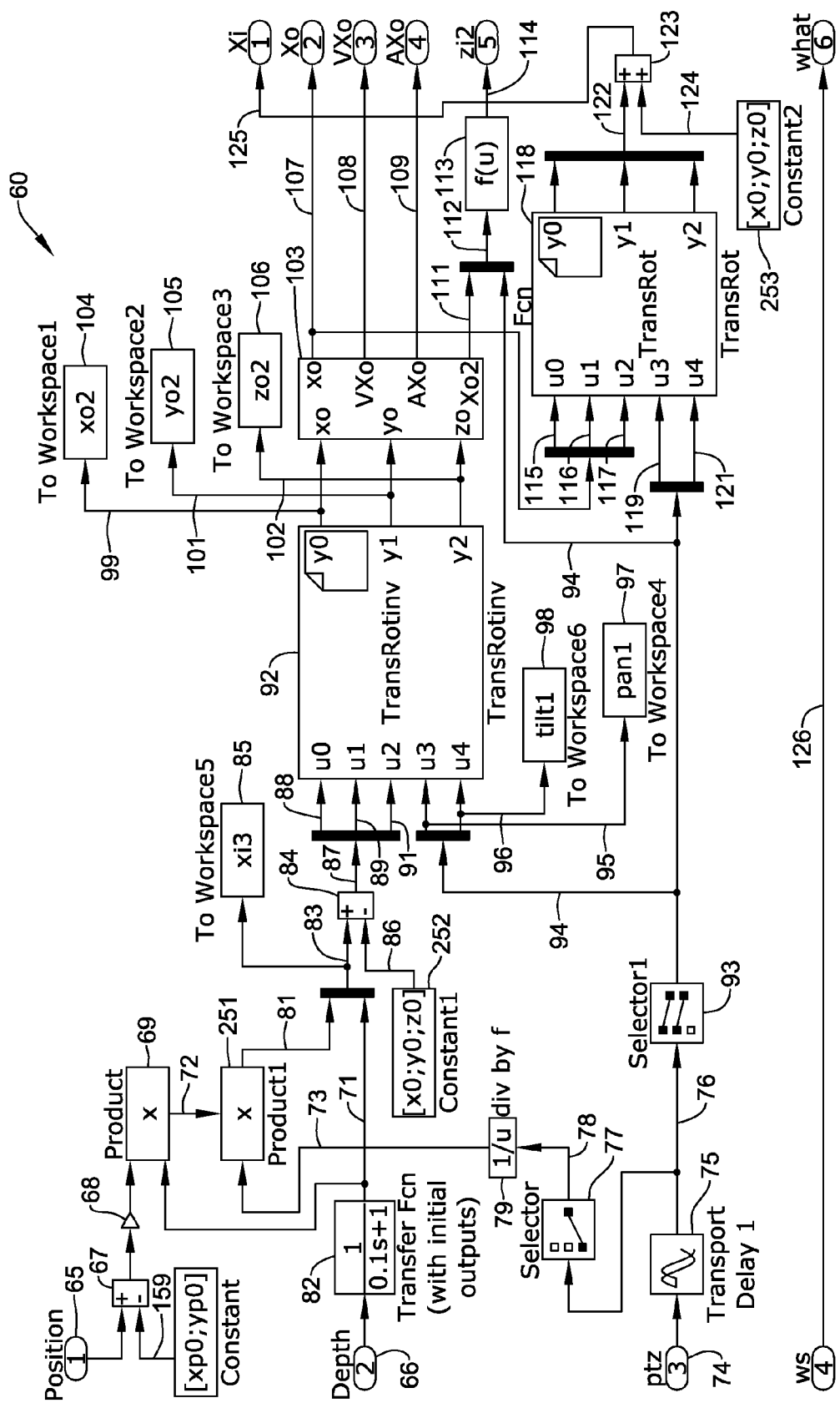
FIG. 7 is a schematic of an illustrative example of a predictor or state estimator in the system.

FIGS. 7, 8, 9 and 10 reveal one implementation of the present system 10. FIG. 7 shows a predictor or state estimator 60 which may have a position input 65 and a depth input 66. Position input 65 may be combined with a constant input $[x_{p0};y_{p0}]$ 159 at combiner 67 having an output which goes to a gain amplifier 68 with a gain K*u (matrix gain). The output of amplifier 68 may go to a product or multiplier 69 that has a signal 71 which is an output of transformation (1/(0.1 s+1)) module 82 of an input depth signal 66. An output 72 may go to a product or multiplier 251 that multiplies signal 72 with a signal 73. A PTZ signal 74 may be input to a transport delay module 75 which has an output 76 that may go to a selector 77. The selector 77 may have an output 78 that may be transformed by a 1/u (divided by f) module 79. The output of module 79 may be the signal 73. An output 81 of multiplier 251 may be. multiplexed with the signal 71 from module 82, into a signal 83, which goes to a combiner module 84 and an $x_{i3}$ workspace 85. Signal 83 may be combined with a signal 86 from a constant $[x_0; y_0; z_0]$ module 252. The output 87 of module 84 may be demultiplexed into signals 88, 89 and 91, which are input to a transformation and rotation inverter module 92, as inputs u0, u1 and u2, respectively. A signal 76 may go to a selector 93 which outputs a signal 94. Signal 94 may be demultiplexed into signals 95 and 96 which are inputs u3 and u4, respectively, of module 92, and input to a pan workspace 97 and a tilt workspace 98. The signals 99, 101 and 102 of $y_0$, $y_1$, and $Y_2$ outputs, respectively, from module 92 may go to inputs $x_o$, $y_o$ and $z_o$ of a filtering and prediction module 103. Also, signals 99, 101 and 102 may go to an $x_{o2}$ workspace 104, a $Y_{o2}$ workspace 105 and $Z_{o2}$ workspace 106. Signals 107, 108, 109 and 111 may proceed from outputs Xo, VXo, AXo and Xo2, respectively, of module 103. Signals 107, 108 and 109 may be outputs Xo, VXo and AXo of predictor or state estimator 60.

Signal 111 may be multiplexed with signal 94 to result in a signal 112 that goes to an f(u) module 113. From module 113 may proceed a $Z_{i2}$ signal 114 as an output of module 60. Signal 107 from module 103 may be demultiplexed into signals 115, 116 and 117 to be inputs u0, u1 and u2, respectively, of a translation and rotation (Fcn) module 118. Signal 94 from selector module 93 may be demultiplexed into signals 119 and 121 to be inputs u3 and u4, respectively, of module 118. $y_0$, $y_1$ and $Y_2$ outputs of module 118 may be multiplexed into a signal 122 to combiner module 123. A signal 124 of a constant $[x_0;y_0;z_0]$ module 253 may go as another input to module 123. A resultant signal 125 from module 123 may be an $x_i$ signal at an output of state estimator module 60. A signal 126 may provide the $w_s$ signal through module 60 to an output of it.

Figure 8:
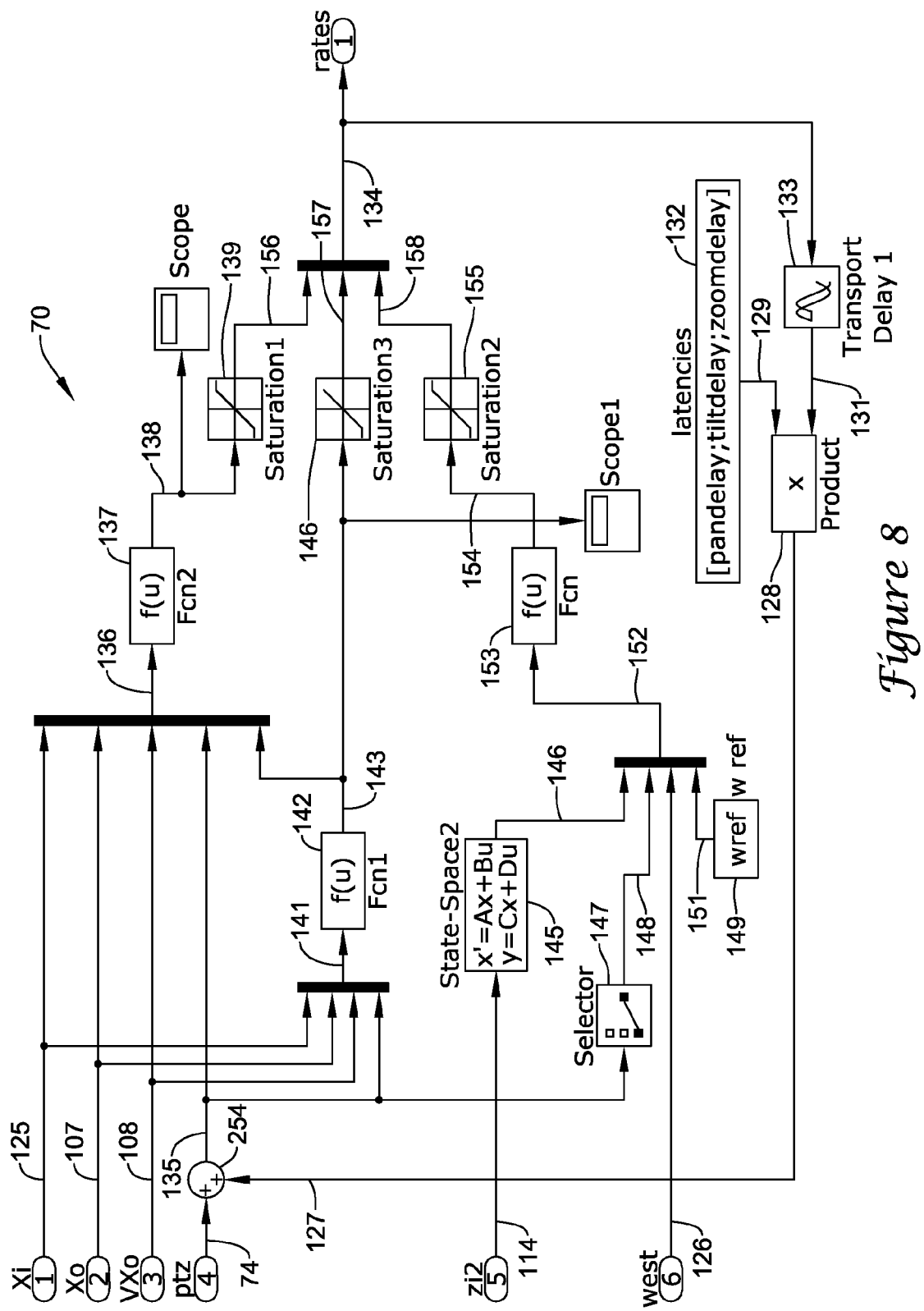
FIG. 8 is a schematic of an illustrative example of a controller in the system.

A controller or control law module 70 of FIG. 8 may have input signals 107, 108, 114, 125 and 126 from the respective outputs of module 60. Also, a PTZ signal 74 may be input to module 70. Signal 74 may go to a summer module 254 with a signal 127 from a product module 128. Two input signals 129 and 131 may be inputs to module 128. Signal 129 may be from [pan delay; tilt delay; zoom delay] latencies module 132. Signal 131 may be from a transport delay module 133. A rates signal 134 may go to the transport delay module 133.

A signal 135 may be output from the summer module 254. Signals 107, 108, 125 and 135 may be multiplexed in to a signal 141. Signal 141 may go to an f(u) (Fcn) module 142 for tilt control. An output signal 143 from module 142, and signals 107, 108, 125 and 135 may be multiplexed into a signal 136 which may go to an f(u) (Fcn) module 137 for pan control. An output signal 138 from module 137 may go to a saturation module 139. Signal 143 from module 142 may go to a saturation module 144.

The signal 135 may go to a selector module 147. Module 147 may have an output signal 148. The signal 114 may go to a state-space $[x'=A_x+B_u; y=C_x+D_u]$ module 145. Module 145 may have an output $(z_t)$ signal 146. A w reference module 149 may provide a wref output signal 151. The input signal 126 to module 70 may be regarded as an estimate of w. Signals 126, 146, 148 and 151 may be multiplexed into a signal 152. The signal 152 may go to an f(u) (Fcn) module 153 for zoom control. An output 154 from module 153 may go to a saturation module 155. Output signals 156, 157 and 158, from saturation modules 139, 144 and 155, respectively, may be multiplexed into the rates signal 134.

Figure 9:
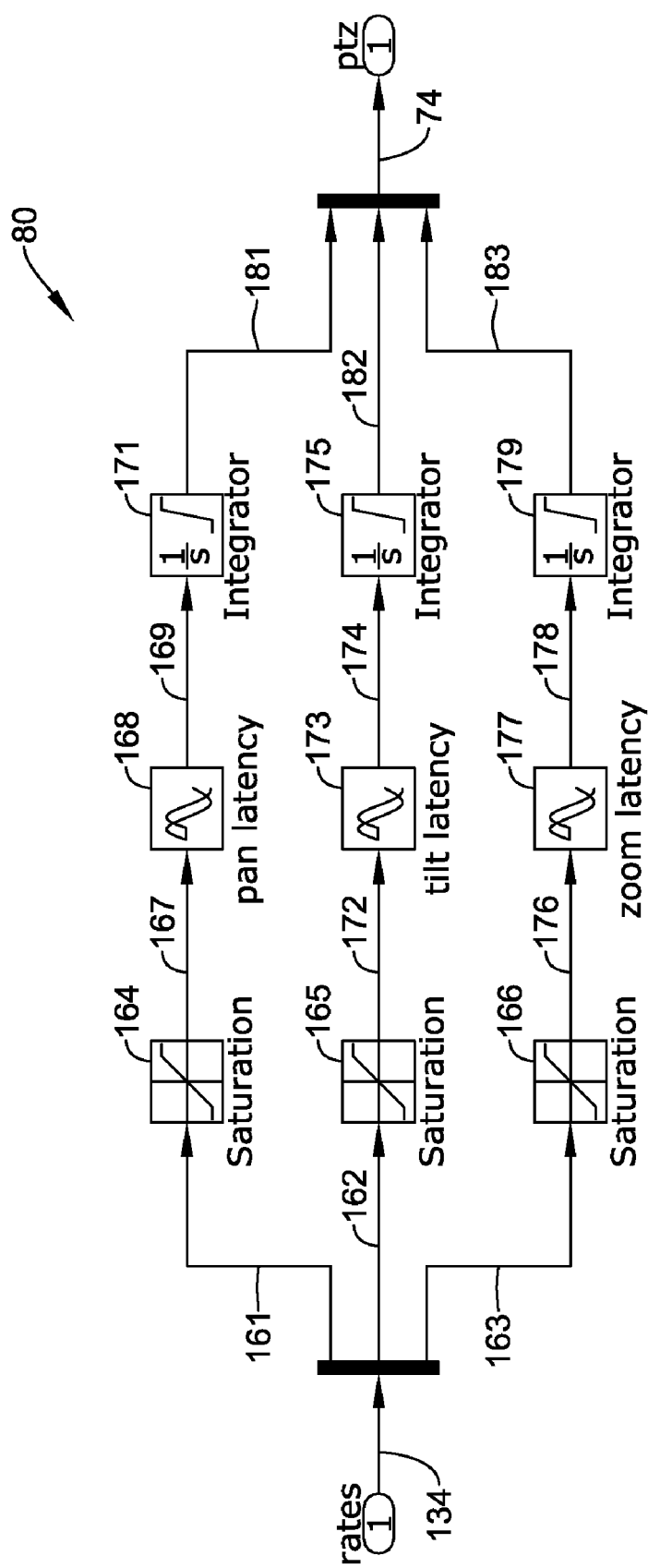
FIG. 9 is a schematic of an illustrative example of a camera actuator in the system.

FIG. 9 shows camera actuator system 80. System 80 may have an input for receiving the rates signal 134 and have an output for providing the PTZ signal 74. The signal 134 may be demultiplexed into signals 161, 162 and 163 which may be inputs to a saturation module 164, a saturation module 165 and a saturation module 166, respectively. An output signal 167 may go from module 164 to a pan latency module 168. An output signal 169 may go from module 168 to an integrator module 171. An output signal 172 may go from module 165 to a tilt latency module 173. An output signal 174 may go from module 173 to an integrator module 175. An output signal 176 may go from module 166 to a zoom latency module 177. An output signal 178 may go from module 177 to an integrator modulator 179. Signals 181, 182 and 183 from integrators 171, 175 and 179, respectively, may be multiplexed into the PTZ signal 74 as an output from module 80.

Figure 10:
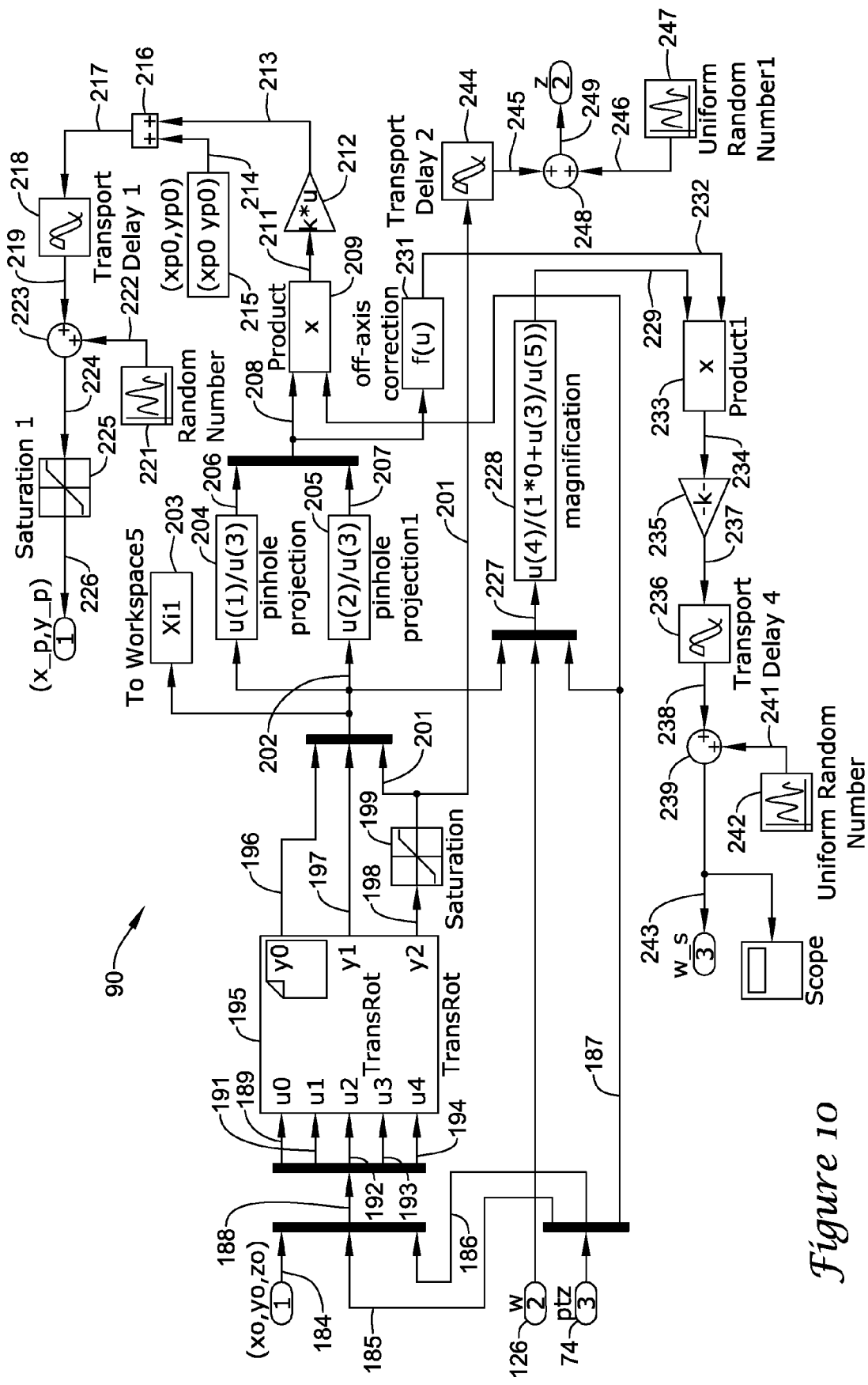
FIG. 10 is a schematic of an illustrative example of circuitry and a mechanism of a camera arrangement.

FIG. 10 is a schematic of an illustrative example of circuitry and mechanism of a camera module 90. The PTZ signal 74 and the w signal 126 may be inputs to module 90. A $(x_o, y_o, z_o)$ signal 184 may be an input to module 90. Signal 74 may be demultiplexed into signals 185, 186 and 187. Signals 184, 185 and 186 may be multiplexed into a signal 188. Signal 188 may be demultiplexed into signals 189, 191, 192, 193 and 194. These signals may be respective inputs (u0, u1, u2, u3 and u4) to a translation and rotation module 195. Output signals 196, 197 and 198 (yo, y1, y2) may come from module 195. Signal 198 may go to a saturation module 199 which may output a signal 201. The signals 196 and 197, and signal 201 may be multiplexed into a signal 202. Signal 202 may go to a workspace module 203, a pinhole projection (u(1)/u(3)) module 204 and a pinhole projection (u(2)/u(3)) 205. An output 206 from module 204 and an output 207 from module 205 may be multiplexed into a signal 208.

Signal 208 and signal 187 may be input to a product (x) module 209 for a product output signal 211. Signal 211 may go to a matrix gain (K*u) amplifier module 212. An output signal 213 and an output signal 214 from a $(x_{p0}, y_{p0})$ module 215 may go to a summing module 216. An output signal 217 may proceed from module 216 to an input of a transport delay module 218. An output signal 219 from module 218 and an output signal 222 from a random number source or generator module 221 may go to a summer module 223. An output signal 224 from module 223 may be input to a saturation module 225. A signal 226 from module 225 may be an $X_p$, $Y_p$ output from camera module 90.

The signals 126, 187 and 202 may be multiplexed into a signal 227. Signal 227 may be an input to a magnification (u(4)/(1*0+u(3)/u(5))) module 228. The signal 208 may go to an off-axis correction (f(u)) module 231. A signal 229 from module 228 and a signal 232 from module 231 may go to a product (x) module 233. An output 234 from module 233 may go to an amplifier module 235 with a gain K. A transport delay module 236 may receive a signal 237 from module 235. A signal 238 from module 236 and a signal 241 from a uniform random generator module 242 may be input to a summer module 239. An output signal 243 from module 239 may be a $w_s$ output for the camera module 90.

Signal 201 may go to a transport delay module 244. An output signal 245 from module 244 and a signal 246 from a uniform random number generator 247 may go to a summer 248. An output signal 249 of summer 248 may be the z output of the camera module 90.

Figure 11B:
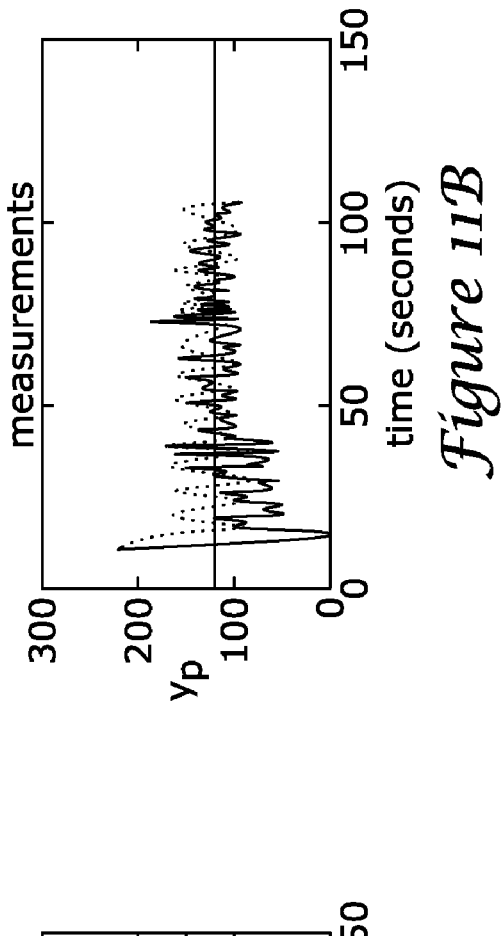
FIGS. 11a, 11b and 11c show measurements of pixel information.
Figure 11A:
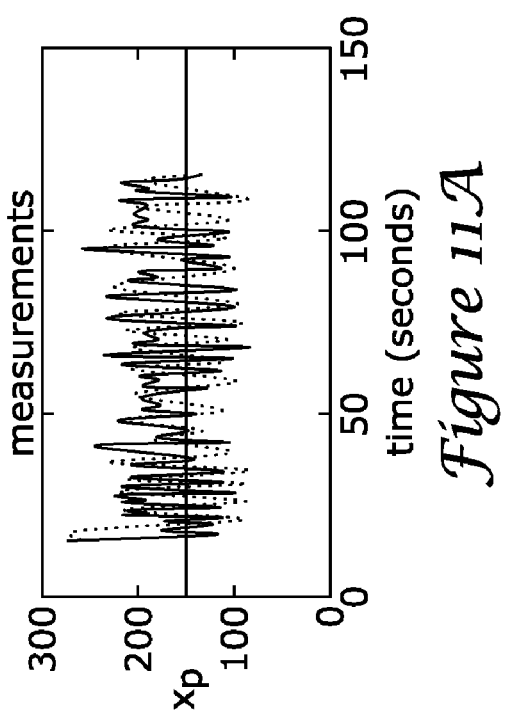
Figure 11C:
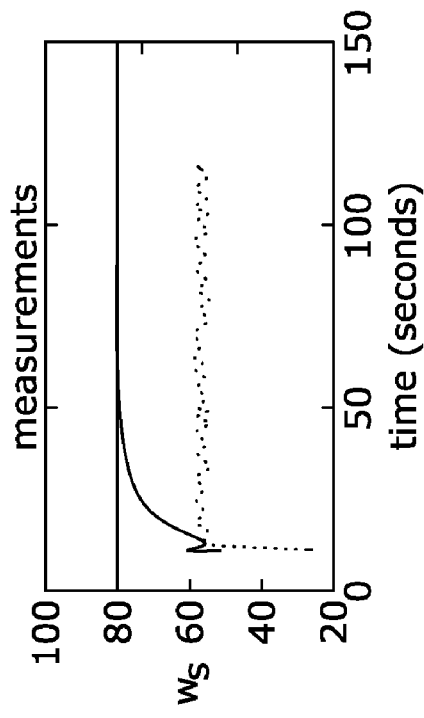
Figure 12D:
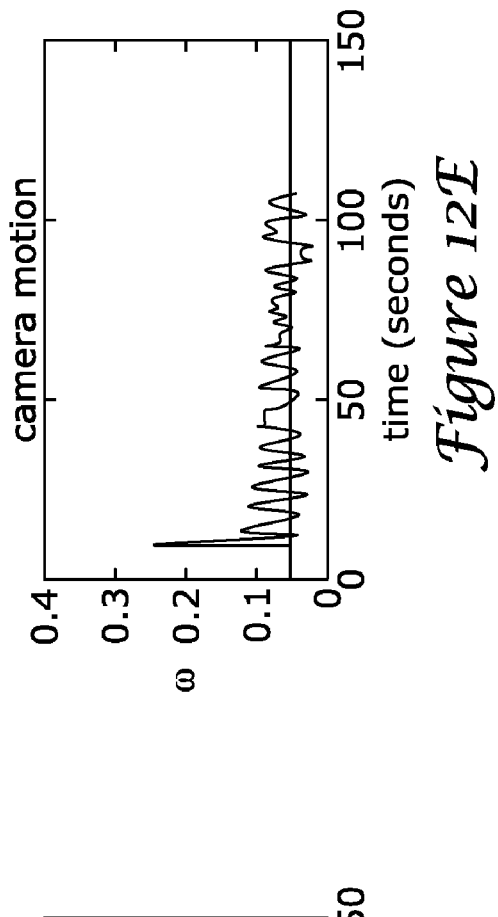
FIGS. 12d, 12e and 12f show plots of camera motion inputs corresponding to the plots of FIGS. 12a, 12b and 12c, respectively.
Figure 12E:
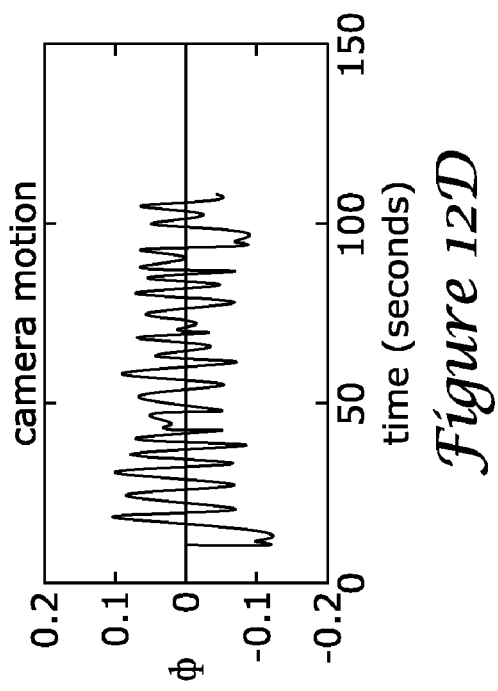
Figure 12F:
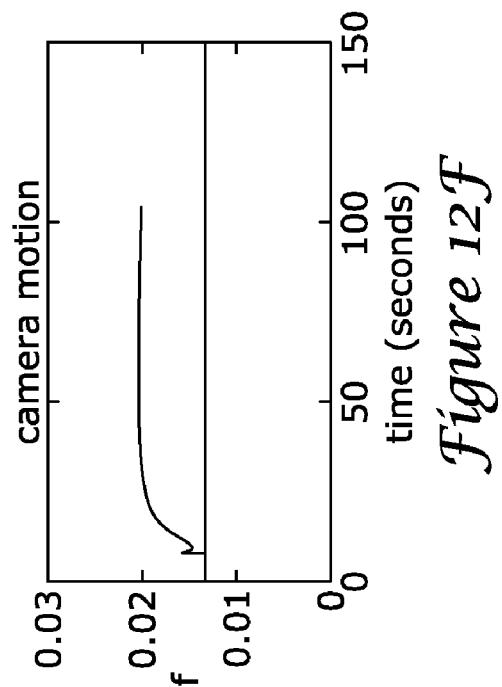

FIGS. 11a, 11b and 11c show the measurements of pixel positions and widths from experimental data (dotted lines), i.e., no control input and the corresponding positions and width using the control laws (herein) in conjunction with the estimation and prediction (solid lines). The set points for each of the measurements are also shown in these Figs. as solid lines, $x_{p0}=160$; $y_{p0}=119$; $w_{ref}=180$. FIGS. 11d, 11e and 11f show the corresponding control inputs—the pan, tilt and zoom rates—over the same time period. In the case of no control (data gathering), these values may be zero. FIGS. 12a, 12b and 12c, for object motion, plot the estimated world coordinates (solid) over the actual measurements (dotted), while FIGS. 12d, 12e and 12f plot the camera pan, tilt and zoom motions both in the case of data gathering (constants-dotted lines) and in the case with control (solid lines).

For the purpose of illustrating the immunity of the control system to noise, results corresponding to those in FIGS. 11a, 11b, 11c, 11d, 11e and 11f and FIGS. 12a, 12b, 12c, 12d, 12e and 12f with high measurement noise may be shown in FIGS. 13a, 13b, 13c, 13d, 13e and 13f and FIGS. 14a, 14b, 14c, 14d, 14e and 14f, respectively.

The actuator chatter produced by noise in measurements may be greatly ameliorated by the quantization of actuator position, or the discrete number of actuator positions available (as the actuators are stepper motors).

Figure 13A:
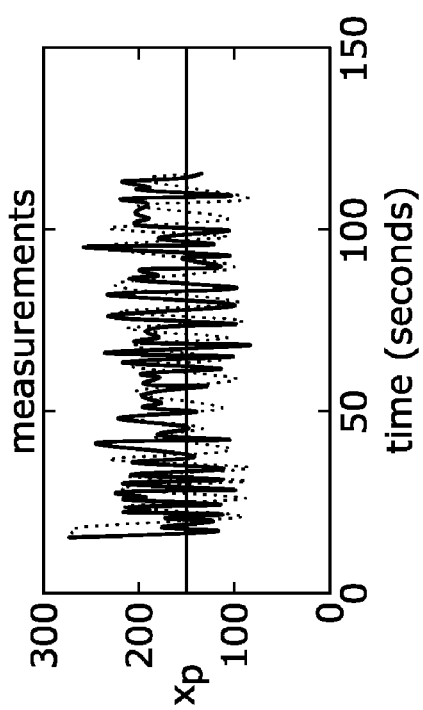
FIGS. 13a, 13b and 13c show the measurements of FIGS. 11a, 11b and 11c with a noise addition.
Figure 13B:
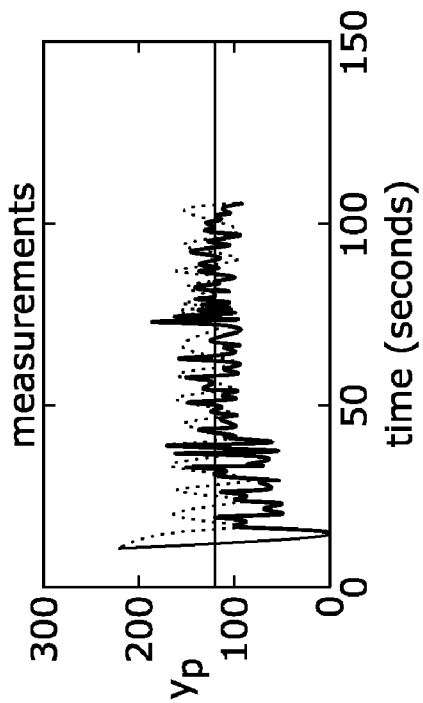
Figure 13C:
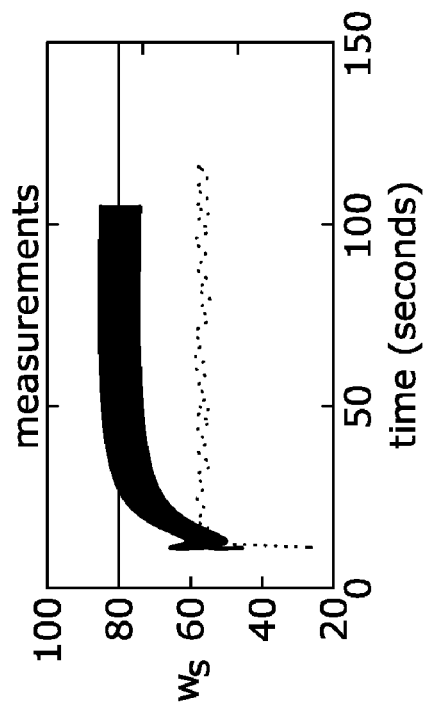
Figure 13D:
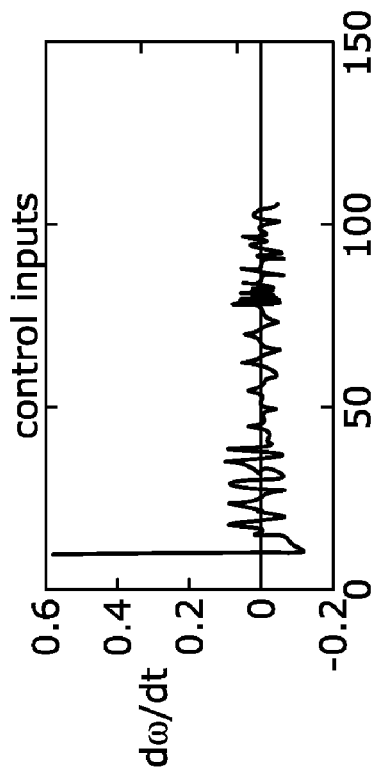
FIGS. 13d, 13e and 13f show the control inputs of FIGS. 11d, 11e and 11f with a noise addition.
Figure 13E:
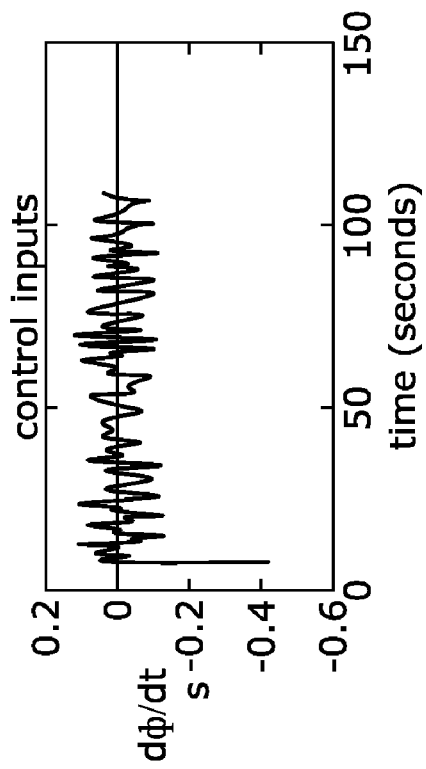
Figure 13F:
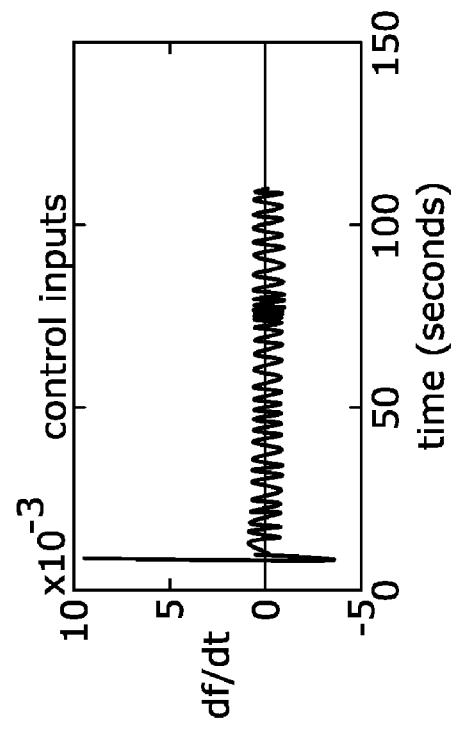
Figure 14A:
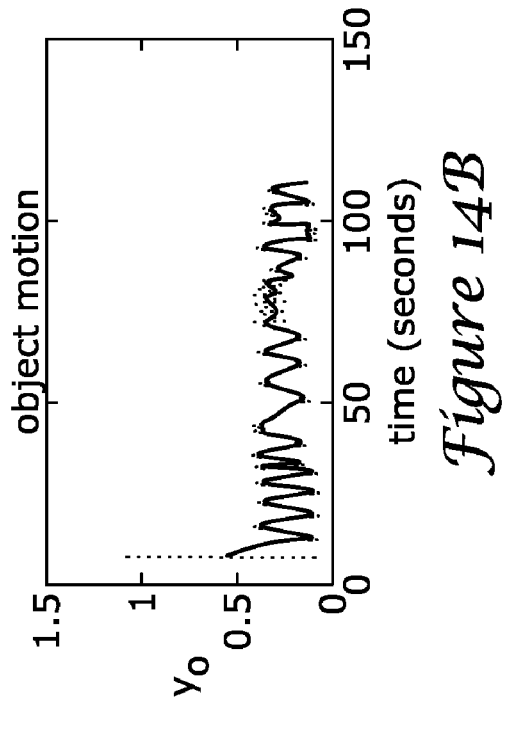
FIGS. 14a, 14b and 14c show the object motion plots of FIGS. 12a, 12b and 12c with a noise addition.
Figure 14B:
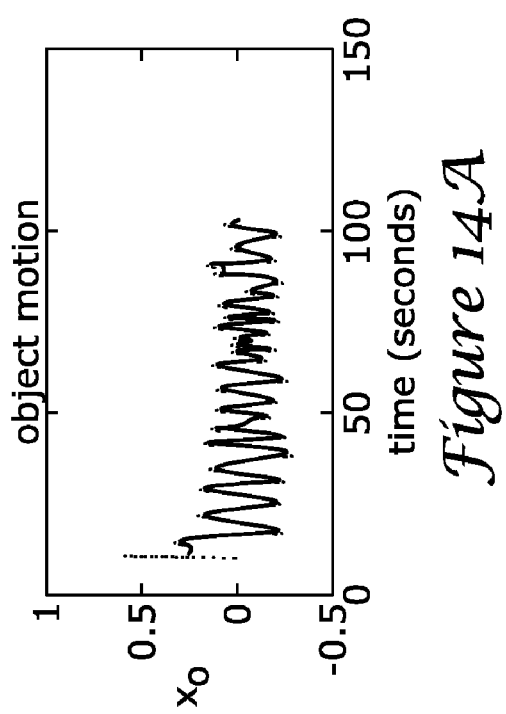
Figure 14C:
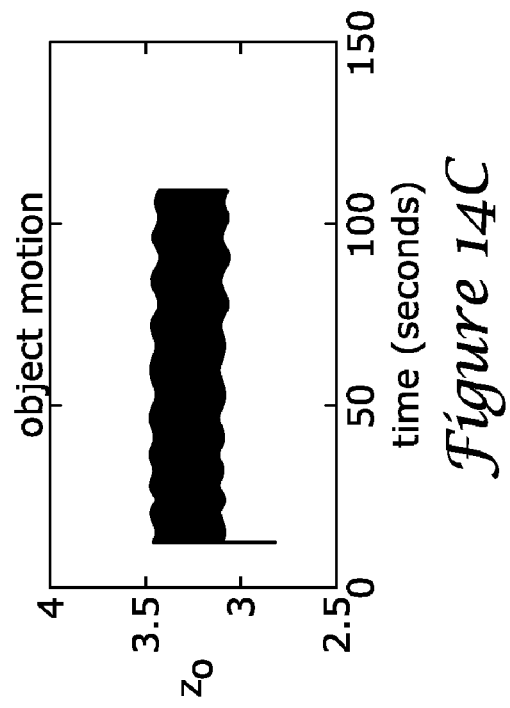
Figure 14E:
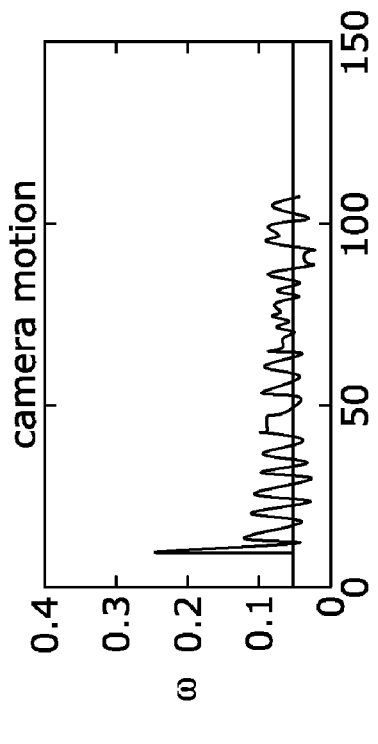
FIGS. 14d, 14e and 14f show the camera motion input plots of FIGS. 12d, 12e and 12f with a noise addition.
Figure 14F:
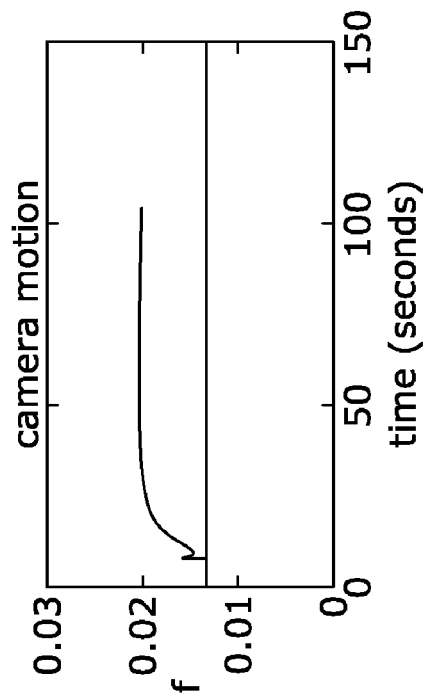
Figure 14D:
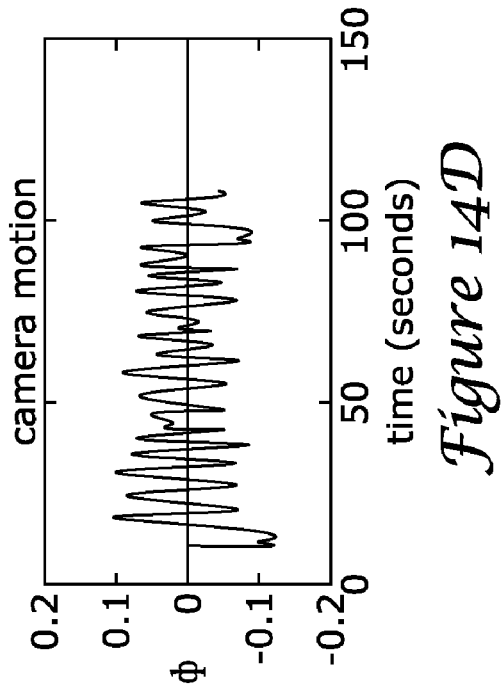

The measurements in FIGS. 11a, 11b and 11c are plotted as $x_p$, $y_p$ and $w_s$ versus time in seconds, respectively. The control inputs in FIGS. 11d, 11e and 11f are plotted as $d\Phi/dt$, $d\omega/dt$ and $df/dt$ versus time in seconds, respectively. The object motion in FIGS. 12a, 12b and 12c is plotted as $x_o$, $y_o$ and $z_o$ versus time in seconds, respectively. The camera motion in FIGS. 12d, 12e and 12f is plotted as $\Phi$, $\omega$ and f versus time in seconds, respectively. The measurements in FIGS. 13a, 13b and 13c are plotted as $x_p$, $y_p$ and $w_s$ versus time in seconds, respectively. The control inputs in FIGS. 13d, 13e and 13f are plotted as $d\Phi/dt$, $d\omega/dt$ and $df/dt$ versus time in seconds, respectively. The object motion in FIGS. 14a, 14b and 14c is plotted as $x_o$, $y_o$ and $z_o$ versus time in seconds, respectively. The camera motion in FIGS. 14d, 14e and 14f is plotted as $\Phi$, $\omega$ and f versus time in seconds, respectively.

Exponential tracking of object motion may be demonstrated with PTZ cameras. While both the control law and the observer are exponentially stable, their combination will not necessarily be exponentially stable under all initial conditions. However, this stability appears achievable for most human motion under the cameras, given the camera's field of view, actuator saturation and rate limits, and latencies.

While there may be an objection to the need for depth measurements, the latter might not be that expensive to implement. Simply ensuring that each point is in the field of view of two cameras may give a depth measurement of adequate accuracy. Other mechanisms for providing depth measurements may include laser range-finders, ladars, and radars. Automobile deer detection radars may be adequate as their cost appears to be dropping significantly.

One may demonstrate coordinated tracking of an object with multiple cameras, include motion compensation in the control law to track objects from moving platforms, such as uninhabited aerial vehicles (UAVS) and unmanned ground vehicles (UGVs), improve target identification and acquisition, and exploit synergy between image processing and control to render the image static for longer periods of time, permitting faster and more reliable image processing.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A tracking system for autonomously tracking an object comprising:
   a processor module connected to a display screen;
   a camera module connected to the processor module; and
   an actuator mechanism connected to the camera module;
   wherein the camera module comprises a depth determining capability; and
   wherein the processor module comprises:
      an image processor for receiving an image from the camera module;
      a state estimator for receiving a depth signal from the camera module, the state estimator connected to the image processor; and
      a controller connected to the state estimator and the actuator mechanism; and
   wherein the image processor provides a pixel position, an image center measurement, and size signal to the state estimator and the state estimator provides position, velocity, and acceleration signals to the controller such that the controller may actuate the actuator mechanism to manipulate the camera module and autonomously track the object, maintaining the image center at the center of the display screen; and
   wherein the camera module comprises a scanning ladar; and
   the ladar is for providing depth and displacement information of the tracked object.

2. The system of claim 1, wherein the camera module further comprises pan and tilt capabilities.

3. The system of claim 1, wherein the camera module further comprises a zoom capability.

4. The system of claim 1, wherein the camera module comprises a depth sensor connected to the processor module.

5. The system of claim 1, wherein the camera module comprises a camera and a range finder fused as one device.

6. The system of claim 1, wherein coordinate information of a tracked object is derived from depth information.

7. The system of claim 1, further comprising a network of camera modules.

8. The system of claim 7, wherein a tracking of an object may be automatically handed off autonomously by the processor module from one camera module to another camera module.

9. The system of claim 7, wherein the network is wireless.

10. The system of claim 1, wherein the controller comprises a control law based on a first principles physical model of the tracking system.

11. The system of claim 10, wherein:
   the controller is for providing of pan, tilt and zoom rate commands based on the control law; and
   the pan, tilt and zoom rate commands are inputs for the camera module.

12. The system of claim 1, wherein a distance of an image of the tracked object from a particular location on a screen of the camera module decreases exponentially over time.

13. The system of claim 1, wherein a difference between a pixel width of the object on a screen of the camera module and pixel width set point decreases exponentially over time.

14. A tracking system comprising:
- a processor module connected to a display screen; and
- a camera module connected to the processor module; and wherein:
the processor module comprises:
- an image processor;
- a state estimator connected to the image processor; and
- a controller connected to the state estimator;
- the camera module comprises a depth determining capability;
- the camera module provides coordinate, image center, and/or depth information of a tracked object to the processor module;
- the controller has a control law based on a model of the tracking system;
- the controller is for providing pan, tilt and zoom rate commands based on the control law to maintain the image center at the center of the display screen; and
- the pan, tilt and zoom rate commands are inputs to the camera module; and wherein the camera module comprises a scanning ladar; and the ladar is for providing depth and displacement information of a tracked object.

15. The system of claim 14, wherein the model comprises latencies of the tracking system.

* * * * *